US012457439B2

(12) United States Patent
Wang

(10) Patent No.: US 12,457,439 B2
(45) Date of Patent: Oct. 28, 2025

(54) IN-EAR WEARABLE DEVICE AND PANEL ASSEMBLY THEREOF

(71) Applicant: EARWEISS TECHNOLOGY (SHENZHEN) CO., LTD., Shenzhen (CN)

(72) Inventor: Yingwei Wang, Nanjing (CN)

(73) Assignee: EARWEISS TECHNOLOGY (SHENZHEN) CO., LTD, Shenzhen (CN)

( * ) Notice: Subject to any disclaimer, the term of this patent is extended or adjusted under 35 U.S.C. 154(b) by 242 days.

(21) Appl. No.: 18/174,198

(22) Filed: Feb. 24, 2023

(65) Prior Publication Data

US 2023/0269511 A1 Aug. 24, 2023

(30) Foreign Application Priority Data

Feb. 24, 2022 (CN) ......................... 202210171922.3

(51) Int. Cl.
*H04R 1/10* (2006.01)

(52) U.S. Cl.
CPC ......... *H04R 1/1016* (2013.01); *H04R 1/1025* (2013.01); *H04R 2420/07* (2013.01)

(58) Field of Classification Search
CPC .. H04R 1/1058; H04R 1/1016; H04R 1/1025; H04R 2420/07; H04R 25/02; H04R 25/603; H04R 25/652; H04R 2201/10; H04R 2225/61; H04R 1/1041; H04R 1/1091; H01R 13/04; H01R 13/02; H01R 13/22

(Continued)

(56) References Cited

U.S. PATENT DOCUMENTS

| | | | | |
|---|---|---|---|---|
| 10,154,334 B1 * | 12/2018 | Lin | ........................ | H04R 19/04 |
| 2010/0027824 A1 | 2/2010 | Atamaniuk et al. | | |

(Continued)

FOREIGN PATENT DOCUMENTS

| | | |
|---|---|---|
| CN | 212752596 U | 3/2021 |
| CN | 212936166 U | 4/2021 |

(Continued)

OTHER PUBLICATIONS

Communication from European Patent Office with Search Report of EP Patent Application No. 23157702.4, dated Jul. 6, 2023.

(Continued)

*Primary Examiner* — Duc Nguyen
*Assistant Examiner* — Chimezie Ezeriwe Bekee
(74) *Attorney, Agent, or Firm* — ScienBiziP, P.C.

(57) ABSTRACT

The present disclosure relates to an in-ear wearable device and a panel assembly thereof. The panel assembly of the in-ear wearable device includes a panel, a mainboard, a manipulation device, a charging device, a battery, an antenna device, a sound pickup device, a speaker assembly, and a wireless communication module. In a plane perpendicular to the panel or the manipulation device, an orthographic projection of the manipulation device partially overlaps an orthographic projection of the charging device; in a plane where the panel or the manipulation device is located, minimum circumscribed circles of the orthographic projections of the manipulation device and the charging device at least partially overlap each other.

10 Claims, 7 Drawing Sheets

(58) Field of Classification Search
USPC ....... 381/23.1, 309, 311, 312, 322, 323, 324
See application file for complete search history.

(56) References Cited

U.S. PATENT DOCUMENTS

| | | | | |
|---|---|---|---|---|
| 2017/0347179 | A1 | 11/2017 | Masaki et al. | |
| 2019/0200112 | A1* | 6/2019 | Briggs ................. | H04R 1/1016 |
| 2020/0374621 | A1* | 11/2020 | Huang ................. | H04R 1/1075 |
| 2021/0027824 | A1 | 1/2021 | Huang | |
| 2021/0185423 | A1 | 6/2021 | Provost et al. | |
| 2021/0185453 | A1 | 6/2021 | Nielsen et al. | |

FOREIGN PATENT DOCUMENTS

| | | | |
|---|---|---|---|
| CN | 213694072 U | | 7/2021 |
| CN | 215420765 U | * | 1/2022 |
| CN | 215773527 U | | 2/2022 |
| WO | 2019085063 A1 | | 5/2019 |

OTHER PUBLICATIONS

Search Report of EP Patent Application No. 23157702.4, dated Jul. 6, 2023.
Liping Ding, The First Office Action with Search Report of Chinese Patent Application No. 202210171922.3, dated Oct. 30, 2024, CNIPA, China.
Hiroaki Kawasaki, Notice of Reasons for Refusal of Japanese Patent Application No. 2023-026148, dated Oct. 8, 2024, JPO, Japan.
Madheer Kumar, Examination Report of Indian Patent Application No. 202324010455, dated Mar. 8, 2024, Delhi, India.
Go Oishi, Notice of Reasons for Refusal of Japanese Patent Application No. 2023-026148, dated Apr. 23, 2024, Japan.

* cited by examiner

IN-EAR WEARABLE DEVICE AND PANEL ASSEMBLY THEREOF

This application claims priority to Chinese Patent Application No. 202210171922.3 filed on Feb. 24, 2022, presently pending, which is incorporated herein by reference in its entirety.

TECHNICAL FIELD

The present disclosure relates to wearable devices, and particularly to an in-ear wearable device and a panel assembly thereof.

BACKGROUND

With the development of science and technology, smart wearable devices such as smart watches, smart bracelets, smart glasses, and virtual reality/augmented reality (VR/AR) devices have been popularized and become an important part of people's lives. In-ear wearable devices have become one of the important types in the smart wearable devices due to the advantages such as being convenient to wear and not interfering with the activities of both hands.

However, the in-ear wearable devices at present are mostly standard-sized products. Due to the different shapes and sizes of various users' acoustic meatuses, the standard-sized products have the problems such as uncomfortable wearing for the users and easy falling off of the devices, thereby limiting wearing time and application scenarios of the devices. Therefore, a customized in-ear wearable device has received more attention.

SUMMARY

For a customized in-ear wearable device, because its customized part (e.g., a housing) is different in shape and size for different users, it is difficult to mount some components that need to be interacted or communicated with the exterior of the device onto the customized part. In this case, the present disclosure considers mounting these components at a panel, for example, under the panel, but how to arrange the components so that they can occupy less panel space and device inner space under normal working is one of the technical problems to be solved urgently.

According to the present disclosure, at least part of the components are compactly arranged together, so that the spaces occupied by those components at the panel and in the housing can be reduced, thereby reducing the sizes of a panel assembly and the device under the condition that those components can work normally, and improving the adaptation rate of the panel assembly and the device wearing comfort.

In an embodiment, there is provided a panel assembly of an in-ear wearable device, comprising a panel, a mainboard, a manipulation device, a charging device, a battery, an antenna device, a sound pickup device, a speaker assembly, and a wireless communication module, wherein: the manipulation device is a touchpad that can be manipulated from above the panel, and the charging device is a device that can charge the in-ear wearable device from above the panel; in a plane perpendicular to the panel or the manipulation device, an orthographic projection of the manipulation device partially overlaps an orthographic projection of the charging device; in a plane where the panel or the manipulation device is located, a minimum circumscribed circle of the orthographic projection of the manipulation device at least partially overlaps a minimum circumscribed circle of the orthographic projection of the charging device.

In an embodiment, an overlap ratio R of the minimum circumscribed circle of the orthographic projection of the manipulation device and the minimum circumscribed circle of the orthographic projection of the charging device is:

$$R = \frac{S_0}{\max(S_1, S_2)}$$

and the overlap ratio R is 70% to 100%, wherein $S_1$ represents an area of the minimum circumscribed circle of the orthographic projection of the manipulation device (130, 230), $S_2$ represents an area of the minimum circumscribed circle of the orthographic projection of the charging device (140, 240), $S_0$ represents an overlap area of the two minimum circumscribed circles, and max $(S_1, S_2)$ represents a larger value of $S_1$ and $S_2$.

In an embodiment, the charging device may comprise a plurality of charging pins extending into an opening of the panel through the manipulation device.

In an embodiment, the manipulation device may comprise a through-hole and/or a depressed portion allowing the plurality of charging pins to pass through.

In an embodiment, the manipulation device may comprise a first through-hole at a center and a second through-hole or a depressed portion at a non-center.

In an embodiment, the plurality of charging pins comprise at least one first polarity charging pin extending into the opening of the panel through the first through-hole, and at least one second polarity charging pin extending into the opening of the panel through the second through-hole or the depressed portion.

In an embodiment, the number of the first polarity charging pin is one, the number of the second polarity charging pins is three, and the second polarity charging pins are arranged in an equilateral triangle with the first polarity charging pin as a center.

In an embodiment, the through-hole is a circular hole, an elliptical hole or an arc-shaped hole.

In an embodiment, a minimum distance from the plurality of charging pins to an outer contour of the manipulation device is within 2 mm.

In an embodiment, upper ends of the plurality of charging pins are all flush with an upper surface of the panel, or the upper ends of the plurality of charging pins are all lower than the upper surface of the panel, or the upper end of at least one of the plurality of charging pins is flush with the upper surface of the panel and the upper ends of other charging pins are lower than the upper surface of the panel.

In an embodiment, the plurality of charging pins are arranged as an arc outside the manipulation device.

In an embodiment, the manipulation device is substantially circular or elliptical.

In an embodiment, the minimum circumscribed circle of the manipulation device has a diameter of 5 to 8 mm.

In an embodiment, the minimum circumscribed circle of the manipulation device has a diameter of 5 to 6 mm.

In an embodiment, the panel assembly may further comprise a magnet, and the orthographic projections of the manipulation device and the charging device on a cross section of the magnet are located in the cross section.

In an embodiment, when a user wears the in-ear wearable device, a projection of the panel in a direction of the user's ear is located within a contour of the ear.

In an embodiment, there is provided an in-ear wearable device, comprising the aforementioned panel assembly and a housing.

In an embodiment, in a plane where the panel or the manipulation device is located, an orthographic projection of the housing covers all or most areas of orthographic projections of the panel, the manipulation device, the charging device, the battery, the antenna device and the sound pickup device.

In an embodiment, an orthographic projection of the housing covers most areas of orthographic projections of the panel, the manipulation device, the charging device, the battery, the antenna device and the sound pickup device means that, in a plane where the panel or the manipulation device is located, 85% or more of an area defined by outer contours of the orthographic projections of the panel, the manipulation device, the charging device, the battery, the antenna device and the sound pickup device is located within the orthographic projection of the housing.

In an embodiment, the housing is a customized housing formed based on a shape and a size of a user's ear, comprising a first protruding portion and a second protruding portion; when the user wears the in-ear wearable device, the first protruding portion is located in an auricular concha cavity of the user or the auricular concha cavity and an external acoustic meatus of the user, and the second protruding portion is located in a cymba conchae of the user; and/or the in-ear wearable device comprises at least one of an in-ear detection sensor, a body temperature sensor, a blood pressure sensor, a blood oxygen sensor, a heart rate sensor, and a blood glucose sensor.

For example by taking a touchpad as the manipulation device and adopting the charging device which partially overlaps the orthographic projection of the manipulation device in a direction perpendicular to the manipulation device and at least partially overlaps a minimum circumscribed circle of the orthographic projection of the manipulation device in a direction parallel to the manipulation device, the present disclosure reduces the spaces occupied by the manipulation device and the charging device at the panel and in the housing, thereby reducing the sizes of the panel assembly and the in-ear wearable device under the condition that the manipulation device and the charging device can work normally, and improving the adaptation rate of the panel assembly and the device wearing comfort.

BRIEF DESCRIPTION OF THE DRAWINGS

Features, advantages and technical effects of the exemplary embodiments of the present application will be described below with reference to the drawings.

DETAILED DESCRIPTION OF THE EMBODIMENTS

Figure 1:
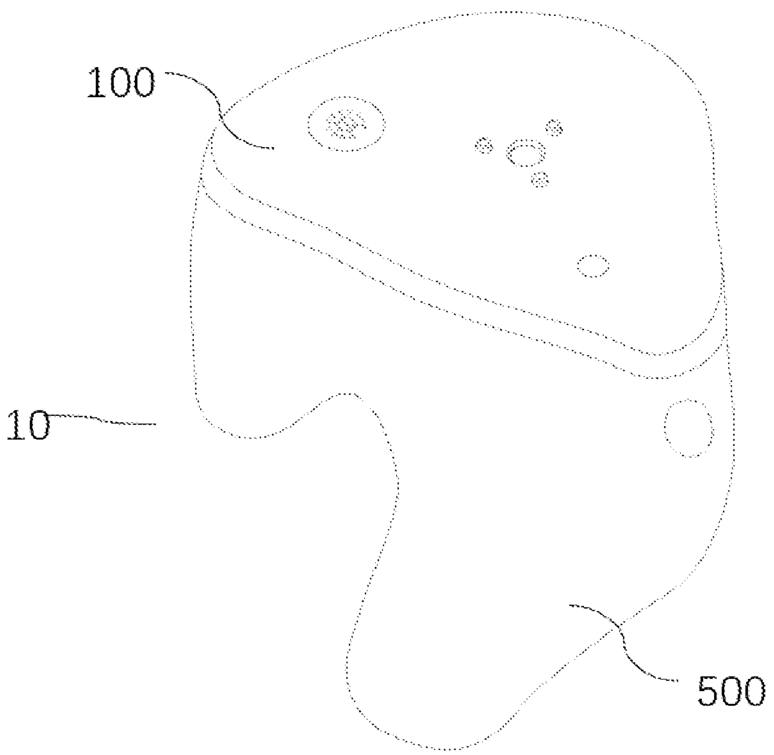
FIG. 1 shows a perspective view of a customized in-ear wearable device according to an embodiment of the present disclosure.

The specific embodiments of the present application are described below with reference to the drawings. In the drawings, the same or similar reference numerals are used to denote the same or similar components, and the repeated descriptions thereof are omitted for simplicity.

FIG. 1 shows a perspective view of a customized in-ear wearable device 10 according to an embodiment of the present disclosure. The customized in-ear wearable device 10 for example may be a customized wireless earphone. Only a single device (e.g., a device worn by the left ear) is shown in FIG. 1, but those skilled in the art will appreciate that the customized in-ear wearable device 10 may include two devices worn by the left and right ears, respectively, and their structures may be substantially symmetrical and communicated wirelessly, and only one of the devices is illustrated and described here for simplicity. Referring to FIG. 1, the customized in-ear wearable device 10 according to this embodiment includes a panel assembly 100 and a customized housing 500. The housing 500 may be a customized housing formed based on the shape and the size of the user's ear. For example, the customized housing 500 may be manufactured using a manufacturing device based on an ear mold taken from the user's ear (including parts such as an external acoustic meatus, an auricular concha cavity, and/or a cymba conchae), and the manufacturing method for example may be 3D printing. The size of the customized housing 500 may be the same as that of the taken ear mold, or slightly smaller than that of the taken ear mold to improve the wearing comfort for some sensitive users.

At present, the in-ear wearable devices are mostly standard-sized products. Due to the different shapes and sizes of various users' acoustic meatuses, the standard-sized products have the problems that the users are uncomfortable to wear and the devices are prone to falling off, thereby limiting wearing time and application scenarios of the devices. In a case where the devices are the standard-sized products, in order to adapt to the sizes of most users' ears (e.g., the auricular concha cavities), the sizes of the devices shall be as small as possible. But in order to ensure stable wearing without falling off, the devices need to be provided with some protrusions so as to be firmly stuck on the ears. In this case, when the standard-sized products are worn, some parts of the acoustic meatuses or the auricles of most users will be compressed, thereby resulting in discomfort caused by long-term wearing. For example, many users will feel uncomfortable with their ears after wearing the devices for 30 minutes or even less. In addition, although the wearing stability of the standard-sized product is improved by providing some protrusions, the improvement degree is limited, and the problem of easy falling off still exists. However, in the present disclosure, since the housing 500 of the customized in-ear wearable device 10 is customized for the user and substantially does not compress the user's ear, the customized in-ear wearable device 10 of the present disclosure improves the wearing comfort compared with the standard-sized products. Moreover, since the housing 500 is customized for the user, the housing 500 has a better fit with the user's ear (e.g., the external acoustic meatus), thereby being stable to wear and not easy to fall off. Under the conditions of good wearing comfort and stability, the user can wear the device for a longer time, such as several hours or even longer. Further, since the user can wear the device for a longer time, it is more possible for the user to apply the device in various scenarios. For example, in addition to the conventional audio and video services, the device can also be used to make voice or video calls, play games, and carry out various virtual reality activities.

Figure 2:
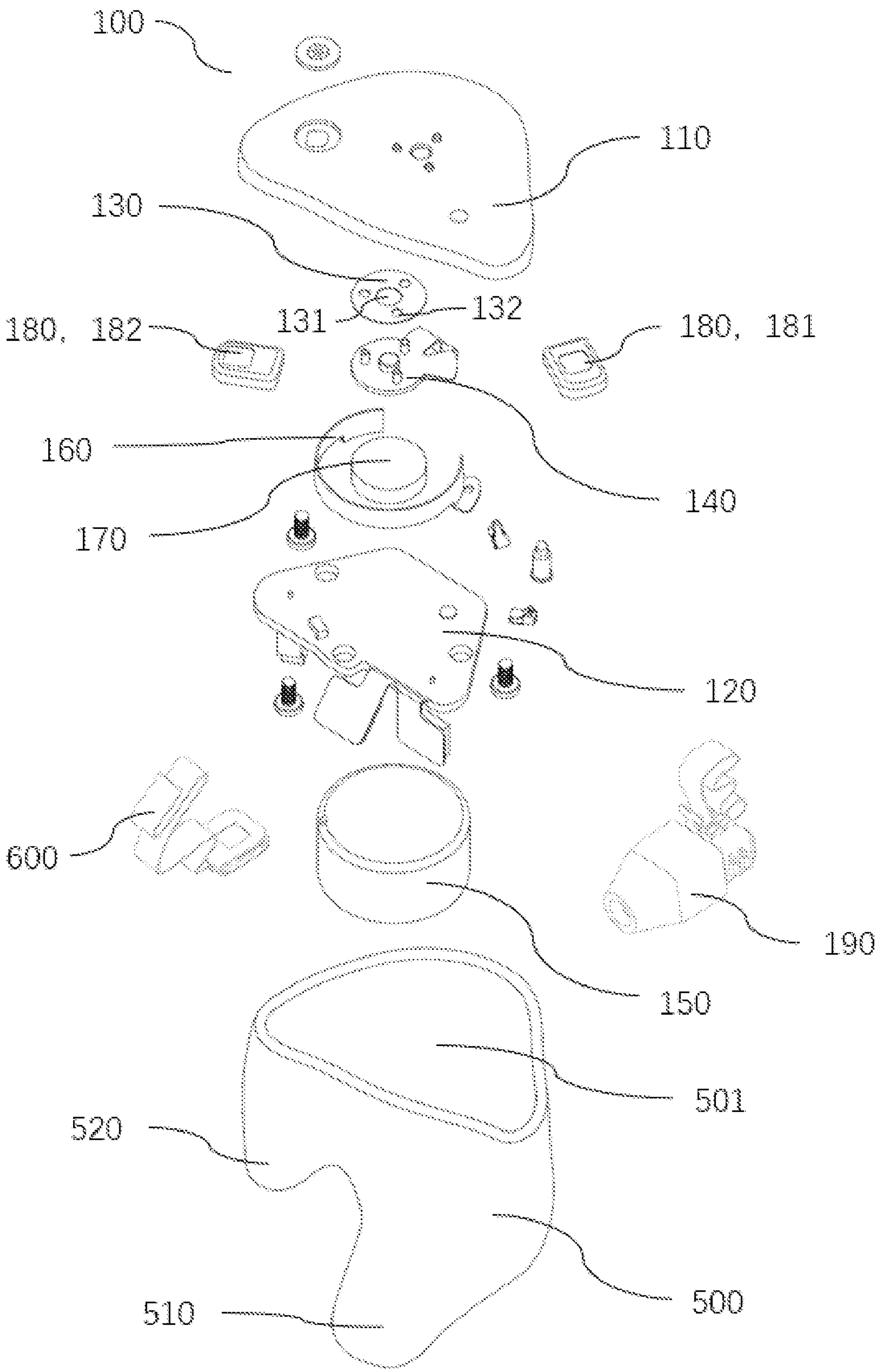
FIG. 2 shows an exploded view of a customized in-ear wearable device according to an embodiment of the present disclosure.

FIG. 2 is an exploded view of a customized in-ear wearable device 10 according to an embodiment of the present disclosure. Similar to FIG. 1, the customized in-ear wearable device 10 according to this embodiment includes a panel assembly 100 and a customized housing 500. Referring to FIG. 2, the panel assembly 100 may include a panel 110, a mainboard 120, a manipulation device 130, a charging device 140, a battery 150, an antenna device 160, a sound pickup device 180, a speaker assembly 190, a wireless communication module 195 (not shown). The manipulation device 130 is a touchpad that can be manipulated from above the panel 110, and the charging device 140 is a device that can charge the in-ear wearable device 10 from above the panel 110. The touchpad for example may be a device which implements a touch by changing parameters such as a resistance or a capacitance of a touch unit on the touchpad by a human body part such as a finger, and it is different from a mechanical manipulation device such as a mechanical knob or a mechanical switch in that the touchpad usually does not generate a visible mechanical motion to implement a manipulation of the touchpad. In addition to the technology of changing the parameters such as the resistance or the capacitance, the present disclosure may adopt other touch technologies as long as they can perform a manipulation above the panel 110. The manipulation above the panel 110 mentioned herein may include a manipulation mode such as manipulating the touchpad (the manipulation device 130) across the panel 110 and partially exposing the touchpad from the panel 110 for manipulation.

In a case where the customized housing 500 is adopted, the housing 500 is customized based on the user's ear, and its shape and size vary depending on different users. Therefore, for the components such as the manipulation device 130, the charging device 140, and the sound pickup device 180 of the customized in-ear wearable device 10 which need to be interacted or communicated with the outside, it is difficult to dispose parts or interfaces where these components are interacted or communicated with the outside onto the housing 500. In view of this situation, in the present disclosure, the parts or the ports where the components such as the manipulation device 130, the charging device 140 and/or the sound pickup device 180 are interacted or communicated with the outside are disposed on the panel 110.

In a case where the customized housing 500 is adopted, if the panel 110 is too large, for example, much larger than an end of the customized housing 500 close to the panel 110, or the panel 110 protrudes largely from the user's ear (e.g., the auricular concha cavity and/or the cymba conchae) when being worn (e.g., with a rod portion like a rod-shaped earphone), the user's wearing comfort and wearing stability will be greatly degraded due to the large size and weight of the part located outside the ear, and noise (e.g., wind noise) will be increased. In view of this situation, in the present disclosure, the panel 110 is designed to be substantially similar to the shape of the end of the housing 500 close to the panel 110. In other words, the panel 110 does not have a large protrusion relative to the housing 500, such as a rod portion protruding from the housing 500. In an embodiment, in a plane where the panel 110 or the manipulation device 130 is located, an orthographic projection of the housing 500 covers all or most areas of orthographic projections of the panel 110, the manipulation device 130, the charging device 140, the battery 150, the antenna device 160 and the sound pickup device 180. Covering the all areas here means, for example, that in the plane where the panel 110 or the manipulation device 130 is located, the orthographic projections of the panel 110, the manipulation device 130, the charging device 140, the battery 150, the antenna device 160 and the sound pickup device 180 are located within the orthographic projection of the housing 500. Covering most areas here means, for example, that in the plane where the panel 110 or the manipulation device 130 is located, 85% or more of an area defined by outer contours of the orthographic projections of the panel 110, the manipulation device 130, the charging device 140, the battery 150, the antenna device 160 and the sound pickup device 180 is located within the orthographic projection of the housing 500. The outer contours of orthographic projections of a plurality of components may be those obtained in conventional ways, such as minimum contour lines that can cover the orthographic projections of the plurality of components obtained by means of curves, folded lines and the like along outer edges of these orthographic projections.

As mentioned above, under the condition that the size of the panel 110 cannot be too large, how to accommodate the parts or ports where the manipulation device 130, the charging device 140 and/or the sound pickup device 180 are interacted or communicated with the outside onto the panel 110 has become one of the problems to be solved urgently in the present disclosure.

For example, by taking a touchpad as the manipulation device 130, and adopting the charging device 140 which partially overlaps the orthographic projection of the manipulation device 130 in a direction perpendicular to the manipulation device 130 and at least partially overlaps a minimum circumscribed circle of the orthographic projection of the manipulation device in a direction parallel to the manipulation device, the present disclosure reduces the spaces occupied by the manipulation device 130 and the charging device 140 at the panel 110 and in the housing 500, thereby reducing the sizes of the panel assembly 100 and the in-ear wearable device 10 under the condition that the manipulation device 130 and the charging device 140 can work normally, and improving the adaptation rate of the panel assembly 100 and the device wearing comfort.

In an embodiment, in a plane perpendicular to the panel 110 or the manipulation device 130, the orthographic projection of the manipulation device 130 partially overlaps the orthographic projection of the charging device 140. For example, in a direction perpendicular to the panel 110 or the manipulation device 130, the charging device 140 passes through the manipulation device 130, or passes through a part or the exterior of the manipulation device 130. In the plane where the panel 110 or the manipulation device 130 is located, a minimum circumscribed circle of the orthographic projection of the manipulation device 130 at least partially overlaps a minimum circumscribed circle of the orthographic projection of the charging device 140.

The minimum circumscribed circle of one or more shapes refers to a minimum circle that can accommodate the one or more shapes in a plane. For example, the minimum circumscribed circle of the orthographic projection of the manipulation device 130 in the plane where the panel 110 is located refers to a minimum circle in which all shapes formed by the orthographic projection of the manipulation device 130 (a projection in a direction perpendicular to the next-mentioned plane serving as a projection reference) are located, in a plane where an upper surface, a lower surface or a whole plane of the panel 110 (e.g., a plane passing through a center or a gravity center of the panel 110 and is substantially parallel to the whole panel) is located or a plane parallel to one of these planes. The upper surface of the panel 110 refers to a surface located outside when the panel 110 is mounted to the housing 500, i.e., a surface facing the exterior of the user's ear when the user wears the in-ear wearable device 10. The lower surface of the panel 110 is a surface on an opposite side of the upper surface. The upper and lower surfaces of other components have similar meanings. Similarly, the minimum circumscribed circle of the orthographic projection of the manipulation device 130 in the plane where the manipulation device 130 is located refers to a minimum circle in which all shapes formed by the orthographic projection of the manipulation device 130 (a projection in a direction perpendicular to the next-mentioned plane serving as a projection reference) are located, in a plane where an upper surface, a lower surface or a whole plane of the manipulation device 130 (e.g., a plane passing through a center or a gravity center of the manipulation device 130 and is substantially parallel to the whole manipulation device) is located or a plane parallel to one of these planes. In the embodiment as shown in FIG. 2, when the plane where the manipulation device 130 is located serves as the projection reference and the outer contour of the manipulation device 130 is circular, the minimum circumscribed circle of the orthographic projection of the manipulation device 130 is a circle serving as the outer contour of the manipulation device 130. The minimum circumscribed circle of the orthographic projection of the charging device 140 is similar to that of the orthographic projection of the manipulation device 130, and will not be described here.

In an embodiment, in the plane where the panel 110 or the manipulation device 130 is located, the minimum circumscribed circle of the orthographic projection of the charging device 140 may be located in the minimum circumscribed circle of the orthographic projection of the manipulation device 130 (or vice versa), and they are completely coincident (the sizes and positions are both the same), or the minimum circumscribed circle of the orthographic projection of the charging device 140 may partially overlap the minimum circumscribed circle of the orthographic projection of the manipulation device 130.

In an embodiment, an overlap ratio may be used to represent the at least partial overlap between the minimum circumscribed circles of the orthographic projections of the manipulation device 130 and the charging device 140 in the plane where the panel 110 or the manipulation device 130 is located. Assuming that in the plane where the panel 110 or the manipulation device 130 is located, an area of the minimum circumscribed circle of the orthographic projection of the manipulation device 130 is $S_1$, an area of the minimum circumscribed circle of the orthographic projection of the charging device 140 is $S_2$, and an overlap area of these two minimum circumscribed circles is $S_0$, then an overlap ratio R of the minimum circumscribed circle of the orthographic projection of the manipulation device 130 and the minimum circumscribed circle of the orthographic projection of the charging device 140 is:

$$R = \frac{S_0}{\max(S_1, S_2)}$$

In the above equation, max $(S_1, S_2)$ represents a larger value of $S_1$ and $S_2$. In an embodiment, the overlap ratio R is 70% to 100%. When the two minimum circumscribed circles are completely coincident, the overlap ratio R is 100%. In an embodiment, the overlap ratio R is 85% to 100%.

In an embodiment, the panel assembly 100 may further include a magnet 170, and the orthographic projections of the manipulation device 130 and the charging device 140 on a cross section of the magnet 170 are located in the cross section. In this case, the outer contours of the manipulation device 130 and the charging device 140 are smaller than the cross section of the magnet 170. In an embodiment, as shown in FIG. 2, the magnet 170 may be located between the mainboard 120 and the charging device 140. In an embodiment, the sound pickup device 180 may include a first sound pickup device 181 and a second sound pickup device 182. Although the sound pickup device 180 is shown to include two sound pickup devices 181 and 182 in FIG. 2, in other embodiments, more or less sound pickup devices may be used according to actual needs. As an example, the sound pickup device may be a microphone such as a micro-electromechanical microphone (also called a silicon microphone).

The in-ear wearable device may include at least one of an in-ear detection sensor, a body temperature sensor, a blood pressure sensor, a blood oxygen sensor, a heart rate sensor and a blood glucose sensor. In an embodiment, the customized in-ear wearable device 10 may include an in-ear detection sensor 600 configured to detect whether the customized in-ear wearable device 10 is in a wearing state. When detecting that the customized in-ear wearable device 10 is in a non-wearing state, the in-ear detection sensor 600 may send a signal (i.e., a signal indicating that the customized in-ear wearable device 10 is in the non-wearing state) to a control unit of the customized in-ear wearable device 10, so as to set the customized in-ear wearable device 10 in a standby state, other non-working state or an off state. When detecting that the customized in-ear wearable device 10 is in the wearing state, the in-ear detection sensor 600 may send a signal (i.e., a signal indicating that the customized in-ear wearable device 10 is in the wearing state) to the control unit of the customized in-ear wearable device 10, so as set the customized in-ear wearable device 10 in the working state, turn on the customized in-ear wearable device 10 in a case where the customized in-ear wearable device 10 is originally turned off, or keep the customized in-ear wearable device 10 in the original working state. The in-ear detection sensor 600 may be included in the panel assembly 100 or may be a component independent of the panel assembly 100. The in-ear detection sensor 600 may detect the wearing state of the in-ear wearable device by one or more of light detection, infrared detection, pressure detection, and the like, which is not limited in the present disclosure.

In an embodiment, the customized in-ear wearable device 10 may include other types of sensors instead of the in-ear detection sensor 600, or may include other types of sensors in addition to the in-ear detection sensor 600. These other types of sensors may include a body temperature sensor, a blood pressure sensor, a blood oxygen sensor, a heart rate sensor, a blood glucose sensor, and the like. In an embodiment, one type of sensor may be used to realize various detections. For example, a single in-ear detection sensor 600 adopting the infrared detection can detect both the wearing state and the body temperature. In an embodiment, a single detection may be realized using various types of sensors, and for example, a wearing state detection is performed using both the body temperature sensor and the heart rate sensor.

Figure 3:
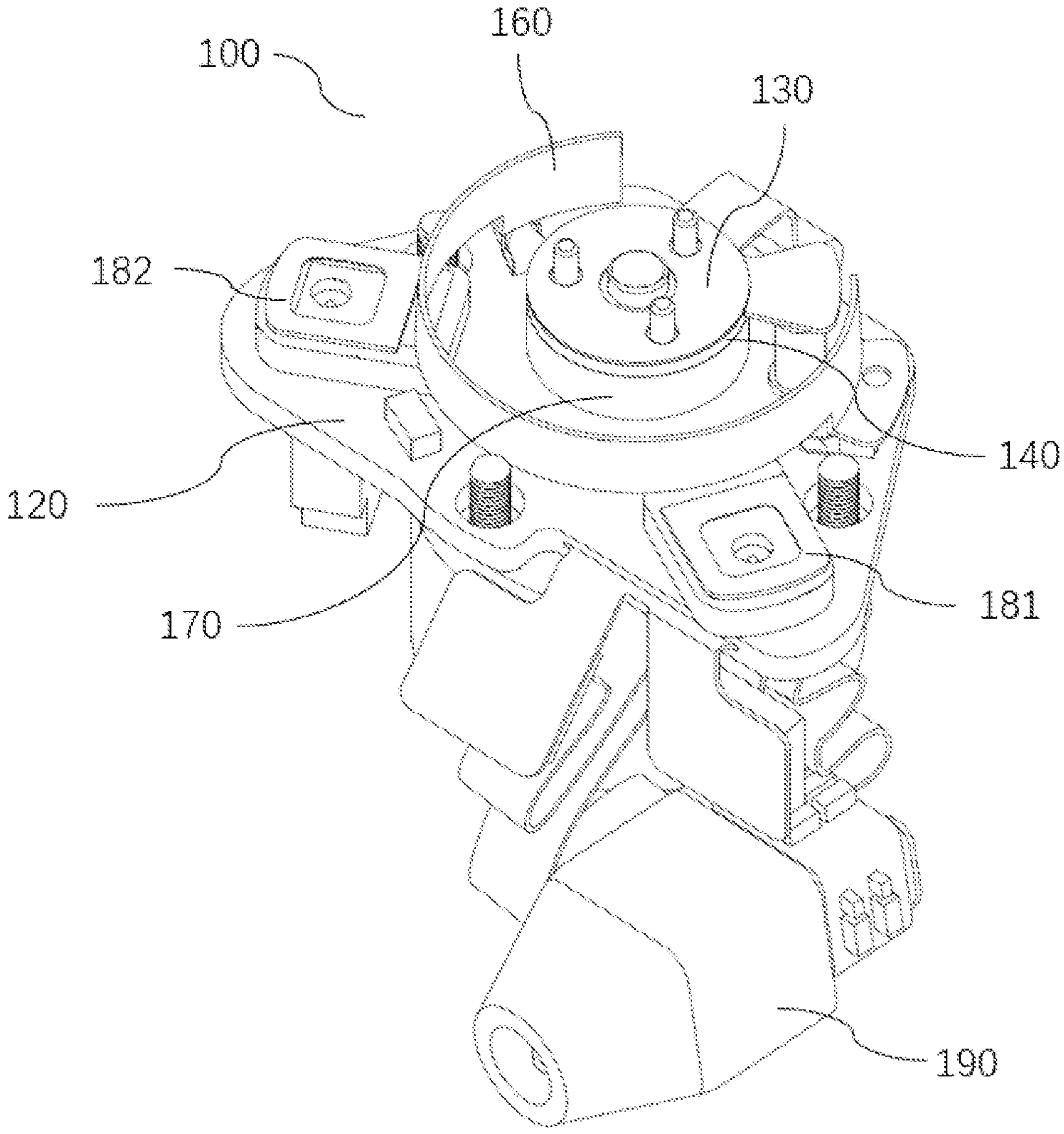
FIG. 3 shows an assembly diagram of components of a panel assembly according to an embodiment of the present disclosure.

Although the panel assembly 100 is illustrated herein to include the panel 110 and the various components, it is not required that the panel 110 and the various components are formed as one piece, and they may be provided separately as appropriate. For example, the panel 110 may be assembled with some components into a first part, other components are assembled into a second part, and these two parts are mounted to the housing 500 at a later assembly stage of the customized in-ear wearable device 10. For example, the panel 110, the manipulation device 130, the charging device 140 and the battery 150 may be arranged in one module, and other components may be arranged in another module. Of course, other arrangements may also be adopted, which is not limited in the present disclosure. FIG. 3 is an assembly diagram of components of a panel assembly 100 according to an embodiment of the present disclosure. Although the panel assembly 100 includes the panel 110, the panel 110 is not shown in FIG. 3 for clarity. As shown in FIG. 3, the components may be assembled together by means of bolts, welding, gluing, clamping and the like.

Referring back to FIG. 2, the components such as the mainboard 120, the manipulation device 130, the charging device 140, the battery 150, the antenna device 160, the magnet 170, the sound pickup device 180, the speaker assembly 190 and the wireless communication module 195 may be located in a space formed by the panel 110 and the customized housing 500. Specifically, these components may be mainly located in an inner cavity 501 of the customized housing 500, and the panel 110 may be configured to enclose the inner cavity 501. The panel 110 may be a flat cover plate, or any rugged or uneven cover plate, as long as other components can work normally.

In the present disclosure, for a certain number of users, the adaptation rate of the panel assembly 100 refers to a ratio of the number of users of the manufactured customized in-ear wearable device 10 to which the panel assembly 100 may be adapted, to a counted total number of users. For example, if the size of the panel 110 is too large, the panel assembly 100 cannot be matched with the housing 500 customized for the user and the user's ear, and this situation is called inadaptation. The calculation of the adaptation rate can adopt a simple mathematical method or any other statistical method. In the present disclosure, by designing the arrangement of the manipulation device 130 and the charging device 140, the spaces occupied by the manipulation device 130 and the charging device 140 at the panel 110 and in the housing 500 are reduced, so that the sizes of the panel assembly 100 and the customized in-ear wearable device 10 can be reduced under the condition that the manipulation device 130 and the charging device 140 work normally, thereby improving the adaptation rate of the panel assembly 100 and the device wearing comfort.

Referring back to FIG. 2, the customized in-ear wearable device 10 according to an embodiment of the present disclosure is further described. In an embodiment, the orthographic projections of the mainboard 120, the manipulation device 130, the charging device 140, the battery 150, the antenna device 160, the magnet 170, the sound pickup device 180, the speaker assembly 190, and the wireless communication module 195 on a plane where the panel 110 is located are located in the panel 110. As described above, the panel 110 may be a flat cover plate or any rugged or uneven cover plate. In a case where the panel 110 is the rugged or uneven cover plate, the plane where the panel 110 is located is an approximate plane that can be formed by the panel 110, and it is not required that most of the panel 110 is located in the plane, and for example, parts of the panel 110 above and below the plane may be the same or similar. The reason why the above components are disposed such that the orthographic projections thereof are located in the panel 110 is mainly to enable the panel 110 to cover the components, so that the panel 110 can easily form the panel assembly 100 and facilitate the mounting with the customized housing 500. If the orthographic projection of one or more components protrudes outside the panel 110, i.e., the panel 110 cannot cover the one or more components, there may be problems such as the protrusion of the component makes the component cannot be mounted into the customized housing 500, or causes a collision with the component and affects the electrical connectivity of the component.

As shown in FIG. 2, in an embodiment, the manipulation device 130, the magnet 170, the mainboard 120 and the battery 150 may be sequentially arranged below the panel 110. By this arrangement, the components can be better accommodated in the inner cavity 501 of the customized housing 500. This is particularly important for the customized in-ear wearable device 10, because it is different from the non-customized in-ear wearable device which can be provided with a large external rod portion or a bean portion. The customized in-ear wearable device 10 only has a small amount of protrusions (e.g., the panel 110 and a small part of the customized housing 500) in a direction perpendicular to the ear (i.e., a direction substantially perpendicular to the panel 110 when the customized in-ear wearable device 10 is worn), and substantially has no protrusion in a direction parallel to the ear (i.e., a direction parallel to the panel 110 when the customized in-ear wearable device 10 is worn). Thus, the inner cavity 501 of the customized housing 500 has a very small volume, and it is necessary to sufficiently design the positions and the sequences of the components so that the components can be accommodated in the inner cavity 501.

As shown in FIG. 2, in an embodiment, the manipulation device 130 is a touchpad that can be manipulated from above the panel 110, and may be substantially circular or elliptical, or may adopt any other shape. The manipulation device 130 (touchpad) is substantially circular or elliptical means that the overall outer contour of the manipulation device 130 is circular or elliptical, and there may be some through-holes or depressions in the manipulation device 130, but this does not affect the shape of the overall outer contour of the manipulation device 130. Those skilled in the art can easily determine the general shape of the manipulation device 130.

By operating with the touchpad instead of a mechanical knob or a mechanical switch, the user can control the customized in-ear wearable device 10 just by applying a small force, thereby reducing the pressure on the ear caused by the manipulation when the user wears the device. Meanwhile, since the touchpad has a long service life and a high stability, the failure rate of the manipulation device 130 is also reduced. The touchpad may be a conventional resistive or capacitive touchpad, and it is also possible to adopt any other touch technology, which is not limited in the present disclosure.

In an embodiment, the minimum circumscribed circle of the manipulation device 130 (touchpad) may have a diameter of 5 to 8 mm. This size not only ensures the normal and reliable touch on the manipulation device 130 (touchpad) (a normal touch will not be achieved if the size is too small), but also prevents the adaptation rate of the panel assembly 100 and the device wearing comfort from being reduced due to the oversizing of the panel 110 as too much space thereof is occupied. Meanwhile, in a case of this size, a through-hole or a depression may be provided on the manipulation device 130 to allow the charging device 140 to pass through. In an embodiment, the minimum circumscribed circle of the manipulation device 130 has a diameter of 5 to 6 mm, in which case, the adaptation rate of the panel 110 and the device wearing comfort can be further improved.

The through-hole and the depressed portion of the manipulation device 130 may adopt various shapes. For example, the through-hole may be a circular hole, an elliptical hole or an arc-shaped hole, and the depressed portion may be an arc-shaped depression or a depression of any other shape.

The operation on the manipulation device 130 may control the On/Off of the customized in-ear wearable device 10, the working mode, the start and the mode of noise reduction, the adjustment of the volume level, and Start, Pause, Previous, Next, Fast Forward, Fast Backward, etc. of the audio and video playing. The working mode of the customized in-ear wearable device 10 for example may be a Hi-Fi (High Fidelity) music mode, a call mode, a transparent mode, or the like. For example, in the Hi-Fi music mode, the audio output mode is adjusted to a mode suitable for music playing and the maximum noise reduction is enabled, so that the user can obtain good music experiences; in the call mode, the voice is enhanced and a proper noise reduction is enabled, so that the user can make a clear voice or video call; in the transparent mode, the external sound is transmitted to the ear without enabling the noise reduction, so that the user can normally perceive the external sound as if not wearing the device, thereby normally interacting with the outside or other persons. The noise reduction modes may include, for example, maximum noise reduction, proper noise reduction, non-noise reduction, and the like, and may also include various noise reduction modes defined according to the application scenarios, such as aircraft noise reduction, high-speed rail noise reduction, subway noise reduction, office noise reduction, and the like. The specific manipulation content is not limited to those described above and may include any other content, and the manipulation content may be preset or user-defined.

In an embodiment, the charging device 140 is a charging pin capable of charging the customized in-ear wearable device 10 from above the panel 110. As shown in FIG. 2, the charging device 140 may include a plurality of charging pins, which are extended into an opening of the panel 110 for example through the manipulation device 130, and contacted with metal contacts of a charger or a charging stand from above the panel 110 through the opening of the panel 110 to charge the customized in-ear wearable device 10.

The manipulation device 130 may include through-holes and/or depressed portions allowing a plurality of charging pins to pass through. In an embodiment, as shown in FIG. 2, the manipulation device 130 includes a first through-hole 131 at a center and a second through-hole 132 at a non-center. In this embodiment, the manipulation device 130 includes one first through-hole 131 and three second through-holes 132. In other embodiments, the manipulation device 130 may include other numbers of first through-holes 131 and second through-holes 132, such as one first through-hole 131 and one second through-hole 132, one first through-hole 131 and two second through-holes 132, two first through-holes 131 and one second through-hole 132, two first through-holes 131 and two second through-holes 132, and so on. The positions of the first through-hole 131 and the second through-hole 132 may be variously set according to requirements. For example, in a case where the manipulation device 130 includes one first through-hole 131 and one second through-hole 132, the first through-hole 131 and the second through-hole 132 may be symmetrical with respect to the center of the manipulation device 130, and of course may also be arranged asymmetrically. In an embodiment, as shown in FIG. 2, in a case where the manipulation device 130 includes one first through-hole 131 and three second through-holes 132, the second through-holes 132 are arranged in an equilateral triangle with the first through-hole 131 as a center. The number and the positions of the through-holes of the manipulation device 130 have been described above, but those skilled in the art will appreciate that the number and the positions of the through-holes may be determined based on the number and the positions of the charging pins. In other words, the number of the through-holes may be equal to or greater than the number of the charging pins, and the through-holes corresponding to the charging pins are disposed at positions allowing the charging pins to pass through.

Although it is shown in FIG. 2 that the charging pin extends into the panel 110 through the through-hole on the manipulation device 130, the charging pin may also pass through the manipulation device 130 in other ways, for example, extending into the panel 110 through the depressed portion on the outer periphery of the manipulation device 130 (touchpad), extending into the panel 110 through the outer contour of the manipulation device 130, and the like.

Figure 4:
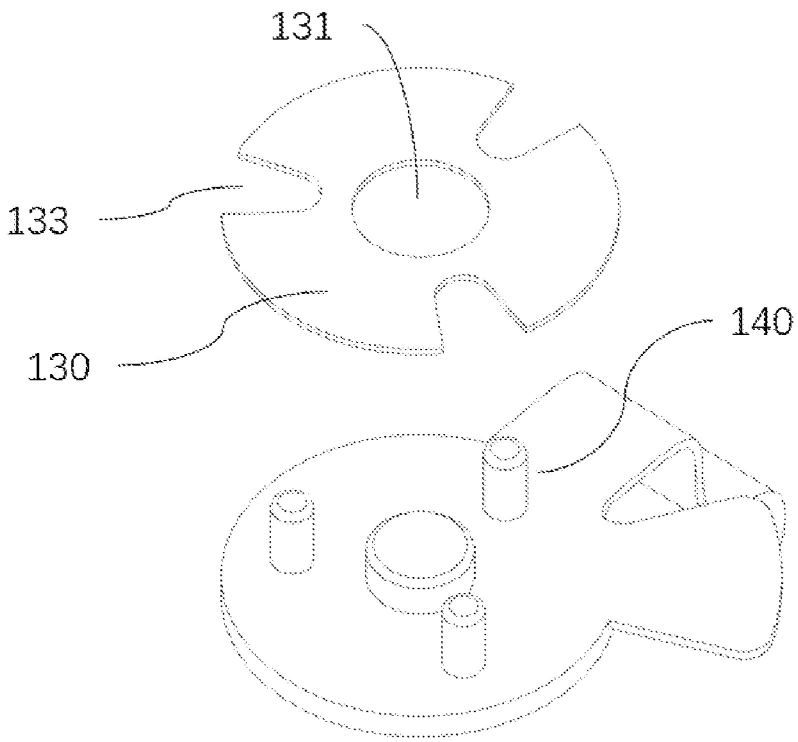
FIG. 4 shows a schematic diagram of a manipulation device and a charging device according to an embodiment of the present disclosure.

FIG. 4 shows a schematic diagram of a manipulation device 130 and a charging device 140 according to an embodiment of the present disclosure. As shown in FIG. 4, an outer periphery of the manipulation device 130 (touchpad) is provided with a depressed portion 133 allowing a plurality of charging pins of the charging device 140 to pass through. Similar to the second through-hole 132, there may be one or more depressed portions 133. In a case where there are a plurality of depressed portions 133, the depressed portions 133 may be evenly or unevenly distributed on the outer periphery of the manipulation device 130. The position where the charging pin passes through the manipulation device 130 may be located within the outer contour of the manipulation device 130 without any depressed portion, so that the presence of the charging device 140 does not increase the size of the panel 110. In the embodiment shown in FIG. 4, the manipulation device 130 further includes one first through-hole 131 in addition to the depressed portion 133. In an embodiment, the manipulation device 130 may only include the depressed portion 133 without any through-hole. In an embodiment, the manipulation device 130 may include at least one of the through-hole, the depressed portion, the outer contour, and the like.

By forming the through-holes or the depressed portions in the manipulation device 130 to allow the charging pins to pass through, the arrangements of the manipulation device 130 and the charging device 140 are more compact, and the spaces occupied by these components on the panel 110 and in the housing 500 are reduced, so that the sizes of the panel assembly 100 and the customized in-ear wearable device 10 can be reduced under the condition that the manipulation device 130 and the charging device 140 work normally, thereby improving the adaptation rate of the panel assembly 100 and the device wearing comfort.

Figure 5:
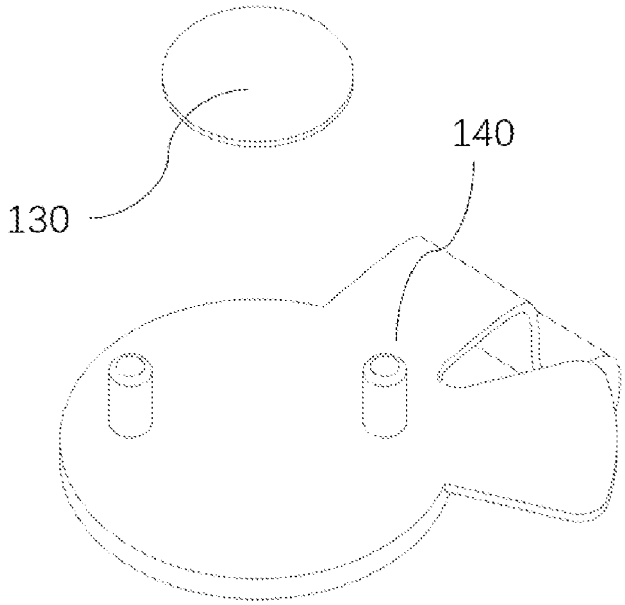
FIG. 5 shows a schematic diagram of a manipulation device and a charging device according to an embodiment of the present disclosure.

FIG. 5 shows a schematic diagram of a manipulation device 130 and a charging device 140 according to an embodiment of the present disclosure. In an embodiment, as shown in FIG. 5, a plurality of charging pins of the charging device 140 may be arranged close to an outer contour of the manipulation device 130 without forming a through-hole or a depressed portion for the manipulation device 130. In this case, a minimum distance from the plurality of charging pins to the outer contour of the manipulation device 130 for example is within 2 mm (e.g., 0.5 to 2 mm), so as to avoid the problem that the arrangement of the components is not compact or too much space is occupied on the panel 110 and in the housing 500 due to the excessive distance.

In the present disclosure, the plurality of charging pins of the charging device 140 may extend into the opening of the panel 110 through one, two or three of the through-hole, the depressed portion and the outer contour of the manipulation device 130. In an embodiment, as shown in FIG. 2, the plurality of charging pins of the charging device 140 all extend into the opening of the panel 110 through the through-holes on the manipulation device 130. In an embodiment, the plurality of charging pins of the charging device 140 all extend into the opening of the panel 110 through the depressed portions on the manipulation device 130. In an embodiment, as shown in FIG. 5, the plurality of charging pins of the charging device 140 all extend into the opening of the panel 110 from the exterior of the outer contour of the manipulation device 130, and there is no through-hole or depressed portion on the manipulation device 130. In an embodiment, as shown in FIG. 4, at least one charging pin of the charging device 140 extends into the opening of the panel 110 through a through-hole on the manipulation device 130, and other charging pins extend into the opening of the panel 110 through the depressed portion on the manipulation device 130. In an embodiment, at least one charging pin of the charging device 140 extends into the opening of the panel 110 through the through-hole or the depressed portion on the manipulation device 130, and other charging pins are arranged close to the outer contour of the manipulation device 130. In an embodiment, at least one charging pin of the charging device 140 extends into the opening of the panel 110 through the through-hole on the manipulation device 130, at least one charging pin extends into the opening of the panel 110 through the depressed portion on the manipulation device 130, and other charging pins are arranged close to the outer contour of the manipulation device 130.

Figure 6:
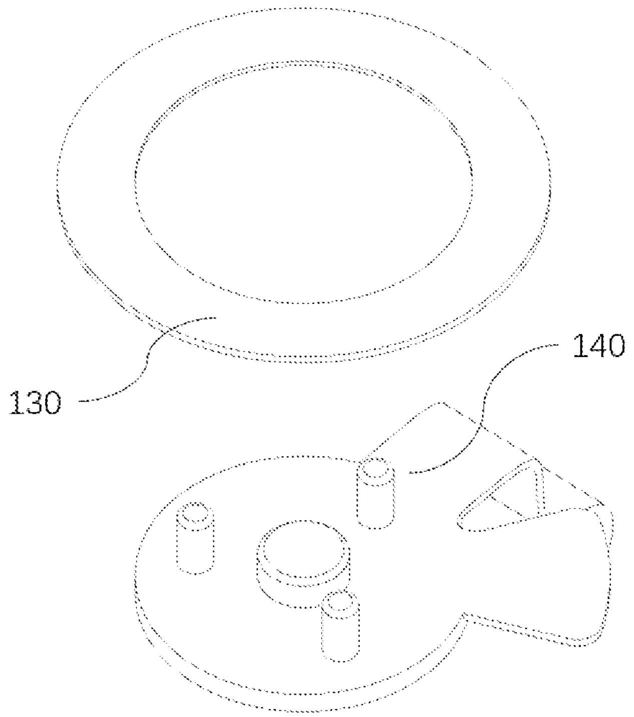
FIG. 6 shows a schematic diagram of a manipulation device and a charging device according to an embodiment of the present disclosure.

FIG. 6 shows a schematic diagram of a manipulation device 130 and a charging device 140 according to an embodiment of the present disclosure. In the embodiment shown in FIG. 6, the manipulation device 130 is configured as a circular ring, and all the charging pins of the charging device 140 extend into the opening of the panel 110 through the interior of the circular ring. In other embodiments, it is also possible to adopt a mode that part of the charging pins extend into the panel 110 through the interior of the circular ring, and other charging pins extend into the panel 110 through at least one of the through-hole, the depressed portion and the exterior of the outer contour.

The plurality of charging pins of the charging device 140 can protrude from the opening of the panel 110, i.e., the upper ends of the charging pins may be higher than the upper surface of the panel 110. In this case, the charging pins may be in good contact with the metal contacts of the charger or the charging stand, but the touch on the manipulation device 130 may be affected. Therefore, in an embodiment, the charging pins may not protrude from the opening of the panel 110, i.e., the upper ends of the charging pins may be flush with or lower than the upper surface of the panel 110, so that the touch on the manipulation device 130 will not be affected when the charging pins protrude from the panel 110. In a case where the upper ends of the charging pins are lower than the upper surface of the panel 110, the upper ends of the charging pins may be set slightly lower than the upper surface of the panel 110. For example, in a case where the thickness of the panel 110 is 1 mm, a distance between the upper ends of the charging pins and the upper surface of the panel 110 in a direction perpendicular to the upper surface of the panel 110 may be 0.1 to 0.8 mm. In this case, the upper ends of the charging pins are set higher than the lower surface of the panel 110, and the positions of the charging pins can be limited using the opening of the panel 110, thereby further improving the contact reliability between the charging pins and the metal contacts of the charger or the charging stand.

In a case where the upper ends of the charging pins are lower than the upper surface of the panel 110, the metal contacts of the charger or the charging stand matched with the charging pins need to be able to extend into the opening in the panel 110, which accommodates the charging pin, so as to contact the charging pins. In an embodiment, the upper ends of the plurality of charging pins are all flush with the upper surface of the panel 110. In an embodiment, the upper ends of the plurality of charging pins are all lower than the upper surface of the panel 110. In an embodiment, the upper end of at least one of the plurality of charging pins is flush with the upper surface of the panel 110, and the upper ends of other charging pins are lower than the upper surface of the panel 110. The 'upper end of the charging pin' mentioned here refers to an end of the charging pin extending into the opening of the panel 110, or an end close to the upper surface of the panel 110.

The number of the charging pins may be two, or any other number greater than two, such as three, four, or the like. The plurality of charging pins may include at least one first polarity (e.g., positive or negative) charging pin and at least one second polarity (e.g., negative or positive) charging pin. The first polarity charging pin for example may extend into the opening of the panel 110 through a first through-hole at the center of the manipulation device 130, and the second polarity charging pin for example may extend into the opening of the panel 110 through a second through-hole or a depressed portion of the manipulation device 130. The number of the second through-hole(s) or the depressed portion(s) may be one or more. In an embodiment, the number of the first polarity charging pin is one, and the number of the second polarity charging pins is three. In an embodiment, three second polarity charging pins are arranged in an equilateral triangle with the first polarity charging pin as a center. The charging pins with the same polarity are usually electrically connected, for example, through conductive wires or metal sheets.

In an embodiment, as shown in FIG. 2, the charging device 140 includes four charging pins, wherein one positive charging pin may be located in the middle, for example, corresponding to the center of the manipulation device 130, the battery 150 or the magnet 170, and three negative charging pins may equally surround the positive charging pin. A plurality of charging pins may be provided for a certain polarity, so that the connection reliability with the charger or the charging stand can be improved, i.e., even if some charging pins are in poor contact with corresponding contacts of the charger or the charging stand due to the problems such as stains, rust and insufficient height, the electrical connection can also be realized by other charging pins. In another embodiment, the polarities of the charging pins may be exchanged, for example, there are one negative charging pin and three positive charging pins. In other embodiments, other numbers of charging pins may also be adopted, such as one positive charging pin and two negative charging pins, or two positive charging pins and one negative charging pin. The thicknesses of the positive charging pin and the negative charging pin may be the same or different. For example, in a case where the charging pins include one positive charging pin and three negative charging pins, the positive charging pin may be set to be thicker than the negative charging pin, thereby improving the connection reliability of a small number of charging pins with the charger or the charging stand and ensuring the impedance consistency of the charging pins with different polarities. The charging pin may have a fixed height or a certain elasticity, so that the charging pin can be better connected when being in contact with the contacts of the charger or the charging stand.

Figure 7:
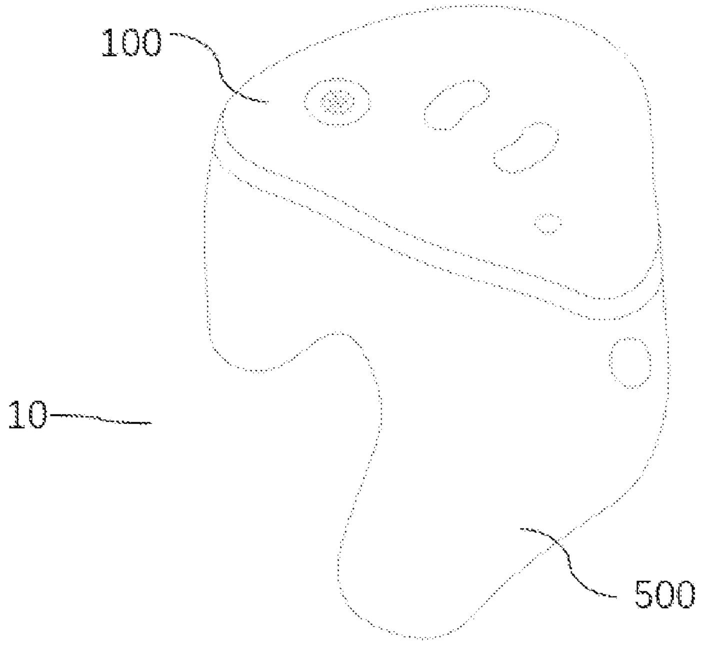
FIG. 7 shows a perspective view of a customized in-ear wearable device according to an embodiment of the present disclosure.

The charging pin may be in a needle shape viewed as a dot or a small circle from above the panel, or may be in various shapes viewed as a straight line segment, an arc segment, a folded line segment, a curve segment, and the like from above the panel. FIG. 7 shows a perspective view of a customized in-ear wearable device 10 according to an embodiment of the present disclosure. In this embodiment, the charging pin is an arc-shaped sheet, and the panel is provided with an arc-shaped opening allowing the charging pin to extend into, which is shown as an arc segment with a certain thickness in FIG. 7, and the connection reliability between the charging pin and the charger or the charging stand can be improved by setting a radian and a thickness. Similar to the previous description, the plurality of arc-shaped charging pins may extend into the opening on the panel through the through-hole, the depressed portion or the exterior of the outer contour of the manipulation device, etc., while other settings are similar and the descriptions thereof are omitted here. In an embodiment, a plurality of charging pins are disposed as an arc outside the manipulation device, and a minimum distance from the plurality of charging pins to the outer contour of the manipulation device may also be within 2 mm, such as 0.5 to 2 mm.

Referring back to FIG. 2, in an embodiment, a support plate may be provided to fix the charging pin. In other embodiments, the charging pin may also be fixed in other manners. In a case where an identical electrode has more than one charging pin, these charging pins may be electrically connected through a conductive metal sheet or metal wire, and the metal sheet or the metal wire for example may also be fixed on the support plate. In the present disclosure, for the sake of clarity, the charging device 140 generally refers to a charging pin, not including a support plate and a metal sheet or a metal wire serving as an electrical connection mechanism. Specifically, when an orthographic projection, an outer contour or a minimum circumscribed circle of the charging device 140 is mentioned herein, it only refers to an orthographic projection, an outer contour or a minimum circumscribed circle of the charging pin, not including other parts such as the support plate, the metal sheet/metal wire.

The battery 150 supplies power required for the working of the customized in-ear wearable device 10, and may adopt a rechargeable battery of a specific specification such as a rechargeable battery of type 1054 (i.e., a cross-sectional diameter of 10 mm and a height of 54 mm) or of any other specification. The battery 150 may be a lithium-ion battery or any other type of battery, which is not limited in the present disclosure.

The antenna device 160 is configured to send and receive wireless signals for the customized in-ear wearable device 10, so that the customized in-ear wearable device 10 can work wirelessly. For example, the antenna device 160 may be disposed close to the lower part of panel 110 when the customized in-ear wearable device 10 is worn, so that the antenna device 160 is not shielded by other metal components and is as far away from other metal components as possible to better send and receive the wireless signals. The antenna device 160 may be in various forms such as a dipole antenna, a planar inverted-F antenna, or a ceramic antenna, which is not limited in the present disclosure.

The magnet 170 is configured to stably attract the customized in-ear wearable device 10 with the charger or the charging stand when the customized in-ear wearable device 10 is charged, thereby improving the charging connection stability. In an embodiment, the magnet 170 may be a circular magnet, in which case its center may coincide with a center of the touchpad 130 or the battery 150. Although only one circular magnet is shown in FIG. 2, those skilled in the art will appreciate that magnets of other numbers and shapes may also be adopted. For example, the customized in-ear wearable device 10 may not include the magnet 170, or may use two or more magnets with different polarities, and the magnet may be of various shapes such as a circle, an ellipse, and a square. In a case where the customized in-ear wearable device 10 uses two magnets with different polarities, corresponding settings may be made on the charger or the charging stand, so that the customized in-ear wearable device 10 and the charger or the charging stand can be better abutted against each other.

The mainboard 120 is configured to load and connect the main components of the customized in-ear wearable device 10, and these components include the manipulation device 130, the charging device 140, the battery 150, the antenna device 160, the sound pickup device 180, the speaker assembly 190, the wireless communication module 195, and the like. These components may be directly or indirectly (for example, by various fixing components or other components) fixed to the mainboard 120 by means of bolts, welding, gluing, and the like, and the components may be connected by a printed circuit, a lead, a flying wire, a spherical pin, and the like on the mainboard 120. In the embodiment shown in FIG. 2, the mainboard 120 is a rigid mainboard, and may be disposed between the magnet 170 and the battery 150, or when there is no magnet 170, disposed between the manipulation device 130 and the battery 150 or between the support plate of the charging device 140 and the battery 150. In an embodiment, the customized in-ear wearable device 10 may be a flexible mainboard, which will be described in detail with reference to FIG. 8.

Referring back to FIG. 2, in an embodiment, the sound pickup device 180 may include two sound pickup devices 181 and 182. Depending on the functionality of the customized in-ear wearable device 10, the sound pickup devices 181 and 182 may be configured to pick up sound of the same type or different types. For example, the first sound pickup device 181 may be configured to pick up call sound and ambient sound, and the second sound pickup device 182 may be configured to pick up the ambient sound. By using two or more sound pickup devices to pick up the sound, the sound picked up by different sound pickup devices can be processed, thereby achieving the effects of sound or sound field enhancement and noise reduction. In other embodiments, other numbers of sound pickup devices 180 may be adopted, such as one, three or more. The sound pickup device 180 may be of any type suitable for the in-ear wearable device, such as a microphone like a micro-electromechanical microphone.

The speaker assembly 190 may include a sound output device configured to output sound for the customized in-ear wearable device 10, and the sound output device may be a moving iron speaker, a moving coil speaker, a coil iron speaker, or the like. In order to enable the sound output from the sound output device of the speaker assembly 190 to enter the acoustic meatus of the user wearing the customized in-ear wearable device 10, the customized housing 500 of the customized in-ear wearable device 10 is usually provided with an opening to allow the sound to pass through. In an embodiment, the speaker assembly 190 may further include a third sound pickup device configured to detect a frequency response characteristic of the sound output from the sound output device of the speaker assembly 190, thereby adjusting the output of the sound output device based on the frequency response characteristic.

The wireless communication module 195 is configured to process the signal of the customized in-ear wearable device 10, so that the customized in-ear wearable device 10 can perform wireless communications. The wireless communication module 195 may be disposed on the mainboard 120 or at other positions. The wireless communication module 195 may be a Bluetooth module or any other type of wireless communication module, as long as it can implement the wireless operation of the customized in-ear wearable device 10. The wireless communication module 195 may be integrated into a central processing unit (CPU) of the customized in-ear wearable device 10, or may be a separate module.

As described above, the customized housing 500 may be manufactured based on an ear mold taken from the user's ear, and the manufacturing method may be 3D printing or any other manufacturing method. In an embodiment, the customized in-ear wearable device 10 may further include a ventilation duct provided in the customized housing 500 for ventilation when the user wears the customized in-ear wearable device 10. One end of the ventilation duct may be located at a protruding portion of the customized in-ear wearable device 10 extending into the external acoustic meatus, and the other end thereof may be located at a portion of the customized housing 500 close to the panel 110, so that the ventilation duct can balance the air pressures of the acoustic meatus and the external space when the user wears the customized in-ear wearable device 10, thereby reducing the discomfort caused by an increase of the pressure inside the ear.

Figure 8:
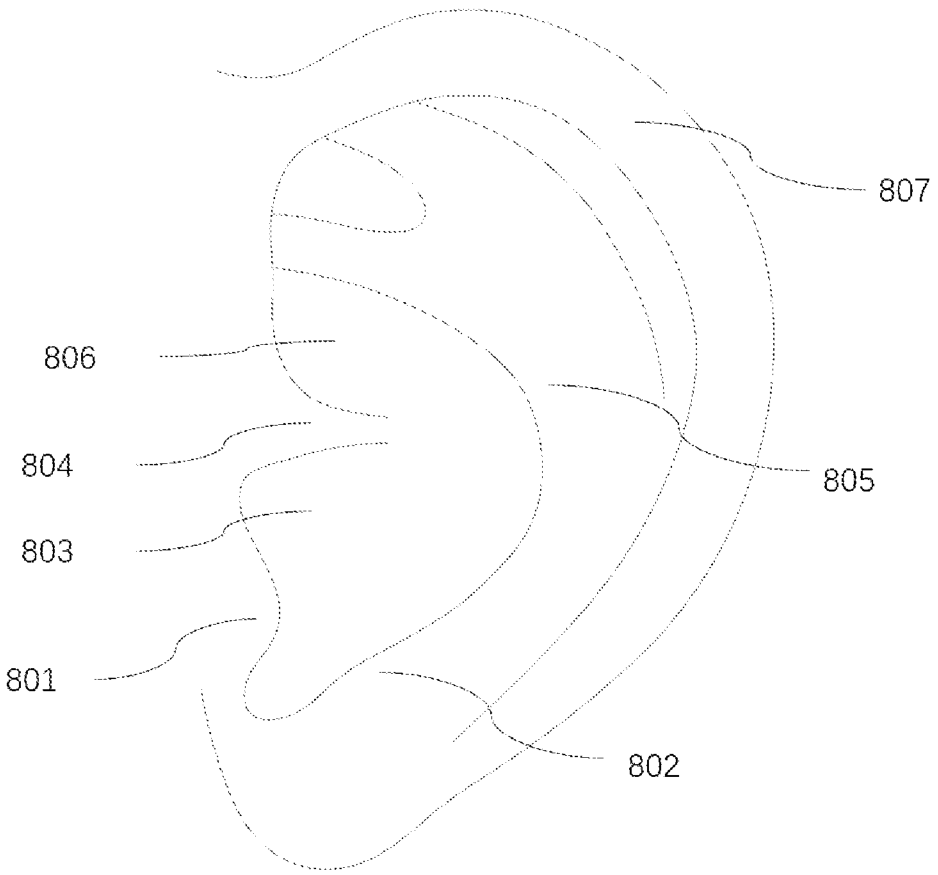
FIG. 8 shows a schematic structural diagram of a user's ear.

In an embodiment, the customized housing 500 may include a first protruding portion 510 and a second protruding portion 520. When the user wears the customized in-ear wearable device 10, the first protruding portion 510 may be located in an external acoustic meatus of the user or an auricular concha cavity and the external acoustic meatus of the user, and the second protruding portion 520 may be located in a cymba conchae of the user. FIG. 8 shows a schematic structural diagram of a user's ear. Referring to FIG. 8 and the description herein, it is possible to acquire a positional relationship between each part of the customized in-ear wearable device 10 and the user's ear when the user wears the customized in-ear wearable device 10. The first protruding portion 510 may include an opening, and the speaker assembly 190 is located in the first protruding portion close to the opening. That is, the sound output from the sound output device of the speaker assembly 190 enters the acoustic meatus of the user through the opening of the first protruding portion 510. In an embodiment, when the user wears the customized in-ear wearable device 10, a projection of the panel 110 in a direction of the user's ear is located in a contour of the ear. The contour of the ear here mainly refers to a ranged formed by the outer contour of the ear (e.g., a helix) and a meeting line of the ear and the face. In an embodiment, the projection of the panel 110 in a direction of the user's ear is mostly (50% to 65%) located in the auricular concha cavity of the user, with a small part (30% to 45%) located in the cymba conchae of the user, and another small part located outside the auricular concha cavity and the cymba conchae while in the contour of the ear.

Figure 9:
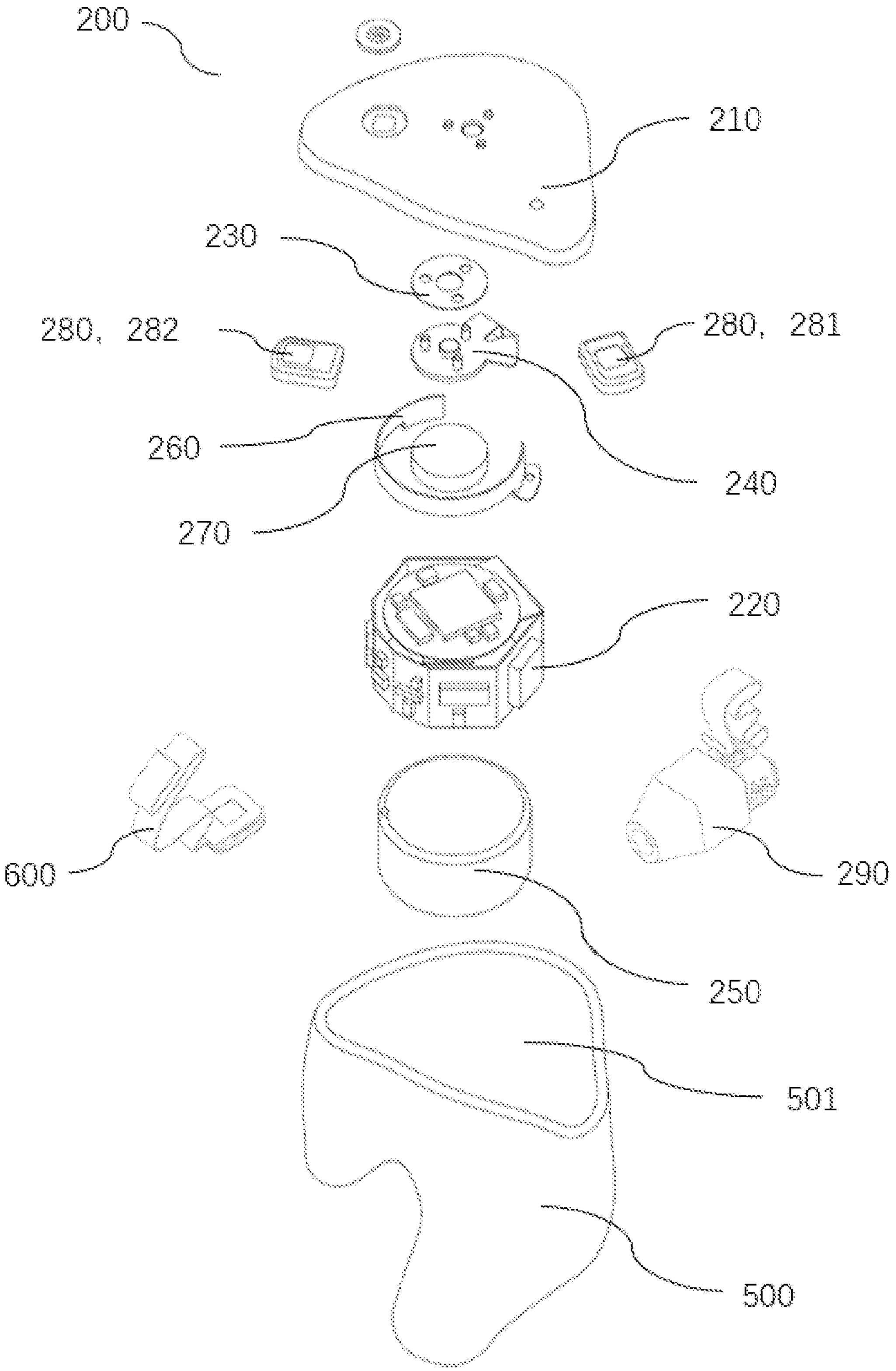
FIG. 9 shows an exploded view of a customized in-ear wearable device according to an embodiment of the present disclosure.

FIG. 9 shows an exploded view of a customized in-ear wearable device 20 according to an embodiment of the present disclosure. As shown in FIG. 9, the customized in-ear wearable device 20 according to this embodiment includes a panel assembly 200 and a customized housing 500. The panel assembly 200 may include a panel 210, a mainboard 220, a manipulation device 230, a charging device 240, a battery 250, an antenna device 260, a magnet 270, a sound pickup device 280, a speaker assembly 290, a wireless communication module 295 (not shown), and the like. Except for the mainboard 220, the panel assembly 200, the panel 210, the manipulation device 230, the charging device 240, the battery 250, the antenna device 260, the magnet 270, the sound pickup device 280, the speaker assembly 290, and the wireless communication module 295 shown in FIG. 9 may be similar to the panel assembly 100, the panel 110, the manipulation device 130, the charging device 140, the battery 150, the antenna device 160, the magnet 170, the sound pickup device 180, the speaker assembly 190, and the wireless communication module 195 shown in FIG. 2, and the detailed descriptions thereof are omitted here for clarity.

As shown in FIG. 9, the mainboard 220 may be a folded circuit board or a flexible circuit board, which may at least partially surround the battery 250. By adopting the folded circuit board or the flexible circuit board, the arrangement flexibility of the components can be improved, and the spaces occupied by the components can be reduced.

Although the technical solutions of the present disclosure have been described in detail as above through the customized in-ear wearable device, those skilled in the art will appreciate that the above technical solutions can also be adopted for non-customized in-ear wearable devices. When the in-ear wearable device is of the non-customized type, both the panel assembly and the housing may be non-customized components, i.e., standard-sized components. In the case of the non-customized in-ear wearable device, by adopting the technical solutions of the present disclosure, the spaces occupied by the components such as the manipulation device and the charging device can also be reduced, thereby reducing the sizes of the panel assembly and the device.

Obviously, the above embodiments of the present disclosure are merely examples for clearly explaining the present disclosure, rather than limitations to the embodiments of the present disclosure. For those skilled in the art, other different forms of changes or modifications can be made based on the above descriptions. It is unnecessary and also impossible to exhaust all the embodiments here. Any modification, equivalent substitution or improvement made within the spirit and principle of the present disclosure should fall within the protection scope of the claims of the present disclosure.

In addition, the terms 'first' and 'second' are only used for descriptive purposes and cannot be construed as indicating or implying any relative importance.

LIST OF THE REFERENCE NUMERALS

10, 20: customized in-ear wearable device
100, 200: panel assembly

110, 210: panel
120, 220: mainboard
130, 230: manipulation device
140, 240: charging device
150, 250: battery
160, 260: antenna device
170, 270: magnet
180, 280: sound pickup device
181, 281: first sound pickup device
182, 282: second sound pickup device
190, 290: speaker assembly
195, 295: wireless communication module
500: customized housing
501: inner cavity
510: first protruding portion
520: second protruding portion
600: in-ear detection sensor
801: tragus
802: antitragus
803: auricular concha cavity
804: helix crus
805: antihelix
806: cymba conchae
807: helix

The invention claimed is:

1. A panel assembly of an in-ear wearable device, comprising a panel, a mainboard, a manipulation device, a charging device, a battery, an antenna device, a sound pickup device, a speaker assembly, and a wireless communication module, wherein:

the manipulation device is a touchpad that can be manipulated from above the panel, and the charging device is a device that can charge the in-ear wearable device from above the panel;

in a plane perpendicular to the panel or the manipulation device, an orthographic projection of the manipulation device partially overlaps an orthographic projection of the charging device;

in a plane where the panel or the manipulation device is located, a minimum circumscribed circle of the orthographic projection of the manipulation device at least partially overlaps a minimum circumscribed circle of the orthographic projection of the charging device; and the charging device comprises a plurality of charging pins extending into an opening of the panel through the manipulation device, and a minimum distance from the plurality of charging pins to an outer contour of the manipulation device is within 2 mm.

2. The panel assembly according to claim 1, wherein an overlap ratio R of the minimum circumscribed circle of the orthographic projection of the manipulation device and the minimum circumscribed circle of the orthographic projection of the charging device is:

$$R = \frac{S_0}{\max(S_1, S_2)}$$

and the overlap ratio R is 70% to 100%, wherein $S_1$ represents an area of the minimum circumscribed circle of the orthographic projection of the manipulation device, $S_2$ represents an area of the minimum circumscribed circle of the orthographic projection of the charging device, $S_0$ represents an overlap area of the two minimum circumscribed circles, and max ($S_1$, $S_2$) represents a larger value of $S_1$ and $S_2$.

3. The panel assembly according to claim 1, wherein upper ends of the plurality of charging pins are all flush with an upper surface of the panel, or the upper ends of the plurality of charging pins are all lower than the upper surface of the panel, or the upper end of at least one of the plurality of charging pins is flush with the upper surface of the panel and the upper ends of other charging pins are lower than the upper surface of the panel.

4. The panel assembly according to claim 1, wherein the manipulation device is substantially circular or elliptical, and the minimum circumscribed circle of the manipulation device has a diameter of 5 to 8 mm.

5. The panel assembly according to claim 1, further comprising a magnet, and the orthographic projections of the manipulation device and the charging device on a cross section of the magnet are located in the cross section.

6. The panel assembly according to claim 1, wherein when a user wears the in-ear wearable device, a projection of the panel in a direction of the user's ear is located within a contour of the ear.

7. An in-ear wearable device, comprising the panel assembly according to claim 1 and a housing.

8. The in-ear wearable device according to claim 7, wherein in a plane where the panel or the manipulation device is located, an orthographic projection of the housing covers all or most areas of orthographic projections of the panel, the manipulation device, the charging device, the battery, the antenna device and the sound pickup device, wherein an orthographic projection of the housing covers most areas of orthographic projections of the panel, the manipulation device, the charging device, the battery, the antenna device and the sound pickup device means that, in a plane where the panel or the manipulation device is located, 85% or more of an area defined by outer contours of the orthographic projections of the panel, the manipulation device, the charging device, the battery, the antenna device, and the sound pickup device is located within the orthographic projection of the housing.

9. The in-ear wearable device according to claim 7, wherein:

the housing is a customized housing formed based on a shape and a size of a user's ear, comprising a first protruding portion and a second protruding portion; when the user wears the in-ear wearable device, the first protruding portion is located in an auricular concha cavity of the user or the auricular concha cavity and an external acoustic meatus of the user, and the second protruding portion is located in a cymba conchae of the user; and/or the in-ear wearable device comprises at least one of an in-ear detection sensor, a body temperature sensor, a blood pressure sensor, a blood oxygen sensor, a heart rate sensor, and a blood glucose sensor.

10. The panel assembly according to claim 1, wherein the manipulation device is substantially circular or elliptical, and the minimum circumscribed circle of the manipulation device has a diameter of 5 to 6 mm.

* * * * *